US012596799B2

(12) United States Patent
Tarimala et al.

(10) Patent No.: US 12,596,799 B2
(45) Date of Patent: Apr. 7, 2026

(54) EXTERNALLY SECURING UNMANAGED DEVICES USING ARTIFICIAL INTELLIGENCE OPERATIONS (AIOPS) FOR NETWORK OPERATIONS

(71) Applicant: Fortinet, Inc., Sunnyvale, CA (US)

(72) Inventors: Naga Kishore Reddy Tarimala, Bangalore (IN); Siva Yogendra Jupudi, Basavanagudi (IN)

(73) Assignee: Fortinet, Inc., Sunnyvale, CA (US)

( * ) Notice: Subject to any disclaimer, the term of this patent is extended or adjusted under 35 U.S.C. 154(b) by 79 days.

(21) Appl. No.: 18/822,744

(22) Filed: Sep. 3, 2024

(65) Prior Publication Data

US 2026/0064835 A1 Mar. 5, 2026

(51) Int. Cl.
*G06F 21/55* (2013.01)
*H04L 9/40* (2022.01)

(52) U.S. Cl.
CPC ............ *G06F 21/554* (2013.01); *H04L 63/10* (2013.01); *H04L 63/1433* (2013.01); *H04L 63/1441* (2013.01); *G06F 2221/034* (2013.01)

(58) Field of Classification Search
CPC . G06F 21/554; G06F 2221/034; H04L 63/10; H04L 63/1433; H04L 63/1441
See application file for complete search history.

(56) References Cited

U.S. PATENT DOCUMENTS 10,440,577 B1 * 10/2019 Vasseur ............... H04L 63/1408
12,406,069 B2 * 9/2025 Kurian .................. G06F 21/552

2011/0126111 A1 * 5/2011 Gill ....................... G06F 21/577
                                                            715/736
2018/0129805 A1 * 5/2018 Samuel ................... G06F 21/55
2018/0219920 A1 * 8/2018 Patel ................... H04L 63/0876
2018/0357560 A1 * 12/2018 Di Pietro ................ G06N 5/04
2020/0162516 A1 * 5/2020 Israel .................... G06F 21/566
(Continued)

FOREIGN PATENT DOCUMENTS

CN      117319066 A * 12/2023 ......... H04L 63/1433
KR      20220162774 A * 12/2022 ........... H04W 8/005
(Continued)

OTHER PUBLICATIONS

Machine translation of Kang, KR 2024-0123461, 1 page (Year: 2024).*

(Continued)

*Primary Examiner* — Christopher A Revak
(74) *Attorney, Agent, or Firm* — Law Office of Dorian Cartwright; Dorian Cartwright

(57) ABSTRACT

An unknown operational technology (OT) or Internet of Things (IoT) device is detected by capturing network transactions related to downstream network devices and identifying the unknown OT or IoT device from non-OT or non-IoT network devices on the enterprise network. A device type of the unknown OT or IoT device is determined using an AIOP detection model. The AIOP detection model is trained from unsupervised cluster learning from a history of externally captured network transactions of the plurality of known OT and IoT devices. The vulnerabilities of the unknown OT or IoT device are assessed by predicting services from correlating the device type to the externally captured network transactions.

20 Claims, 6 Drawing Sheets

400

(56)                    References Cited

U.S. PATENT DOCUMENTS

| | | | | |
|---|---|---|---|---|
| 2020/0202007 A1* | 6/2020 | Nagaraja | .................... | G06F 8/71 |
| 2021/0014689 A1* | 1/2021 | Wang | .................. | H04L 63/1441 |
| 2023/0370334 A1* | 11/2023 | Mannengal | ............ | H04L 43/04 |
| 2024/0223596 A1* | 7/2024 | Sellars | ................ | H04L 63/1433 |
| 2025/0384131 A1* | 12/2025 | Kornegay | ............ | G06F 21/565 |

FOREIGN PATENT DOCUMENTS

| | | | | | |
|---|---|---|---|---|---|
| KR | 20240123461 A | * | 8/2024 | ............ | G06N 20/00 |
| WO | WO-2025097073 A1 | * | 5/2025 | ......... | H04L 63/1433 |

OTHER PUBLICATIONS

Machine translation of Du et al, CN 117319066 A, pp. 1-3 (Year: 2023).*

Machine translation of Du, KR 10-2022-0162774, p. 1 (Year: 2022).*

* cited by examiner

<u>100</u>

300

| Destinations ⬦ | Application ⬦ | Bytes ⬦ | Sessions ⬦ | Bandwidth ⬦ |
|---|---|---|---|---|
| 129.227.192.6 | MQTT | 3.46 kB | 1 | 0 B/s |
| time.android.com | NTP | 152 B | 1 | 0 B/s |

| Application ⬦ | Category ⬦ | Risk ⬦ | Bytes ⬦ | Sessions ⬦ | Bandwidth ⬦ |
|---|---|---|---|---|---|
| MQTT | Network-Service | | 3.46 kB | 1 | 0 B/s |
| NTP | Network-Service | | 152 B | 1 | 0 B/s |

START

TRAIN AIOP MODELS WITH HISTORICAL
TRANSACTIONS FROM ENTERPRISE
NETWORK
410

MONITOR UNMANAGED DEVICES FOR
NETWORK SECURITY ISSUES
420 (SEE DETAILS IN FIG. 5)

TAKE A SECURITY ACTION RESPONSIVE TO
DETECTED ANOMALOUS ACTIVITY
430

END

600

EXTERNALLY SECURING UNMANAGED DEVICES USING ARTIFICIAL INTELLIGENCE OPERATIONS (AIOPS) FOR NETWORK OPERATIONS

FIELD OF THE INVENTION

The invention relates generally to computer networks, and more specifically, for externally securing operational technology (OT) and Internet of Things (IoT) devices on an enterprise network using Artificial Intelligence Operations (AIOPs).

BACKGROUND

Enterprise networks are constantly under attack by malicious processes, such as honeypot access point detection, access point impersonation, and man-in-the-middle attacks. Network devices can expose an interface (e.g., via network ports or API) for network access or open a network layer communication channel for performing fetch or push data operations. Threat actors work in various ways to exploit these interface/communication channels and insert malicious content or code to extract enterprise level sensitive information or disrupt enterprise productivity in various ways.

Network administrators play a crucial role in maintaining the security of an organization's network. Their responsibilities often extend to collaborating with other IT and security professionals to create a comprehensive security posture. Network operations teams are tasked with ensuring the availability, reliability, and performance of the network to support the organization's business operations.

With increasing numbers of network devices and network device types, in particular through enterprise support for bring your own device (BYOD), it becomes even more challenging to ensure network security. Network administrators are not able to manually keep pace with the exponential number of threats.

What is needed is a robust technique for externally securing unmanaged devices, such as OT and/or IoT devices, on an enterprise network using AIOPs.

SUMMARY

To meet the above-described needs, methods, computer program products, and systems for securing OT and/or IoT devices on an enterprise network using AIOPs.

In one embodiment, an unknown operational technology OT or IoT device is detected by capturing network transactions related to downstream network devices and identifying the unknown OT or IoT device from non-OT or non-IoT network devices on the enterprise network. The plurality of OT and IoT devices are unable to internally execute non-native apps.

In another embodiment, a device type of the unknown OT or IoT device is determined using an AIOP detection model. The AIOP detection model is trained from unsupervised cluster learning from a history of externally captured network transactions of the plurality of known OT and IoT devices. The vulnerabilities of the unknown OT or IoT device are assessed by predicting services from correlating the device type to the externally captured network transactions.

In yet another embodiment, the unknown OT or IoT device is then monitored to detect anomalous activity related to an assessed vulnerability of the unknown OT or IoT device, using an AIOP intrusion model generated from the history of known OT and IoT devices. Responsive to detecting anomalous activity, a security takes an action based on relevant security rules Advantageously, AIOPs improves network performance and network device performance with increased security measures.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 3A and 3B is a more detailed block diagram illustrating screenshots of transaction data, according to an embodiment.

DETAILED DESCRIPTION

Methods, computer program products, and systems for securing unmanaged devices, such as OT and IoT devices, on an enterprise network using AIOPs. The following disclosure is limited only for the purpose of conciseness, as one of ordinary skill in the art will recognize additional embodiments given the ones described herein.

I. Systems for External AIOPs Security of Unmanaged Devices (FIGS. 1-3)

Figure 1:
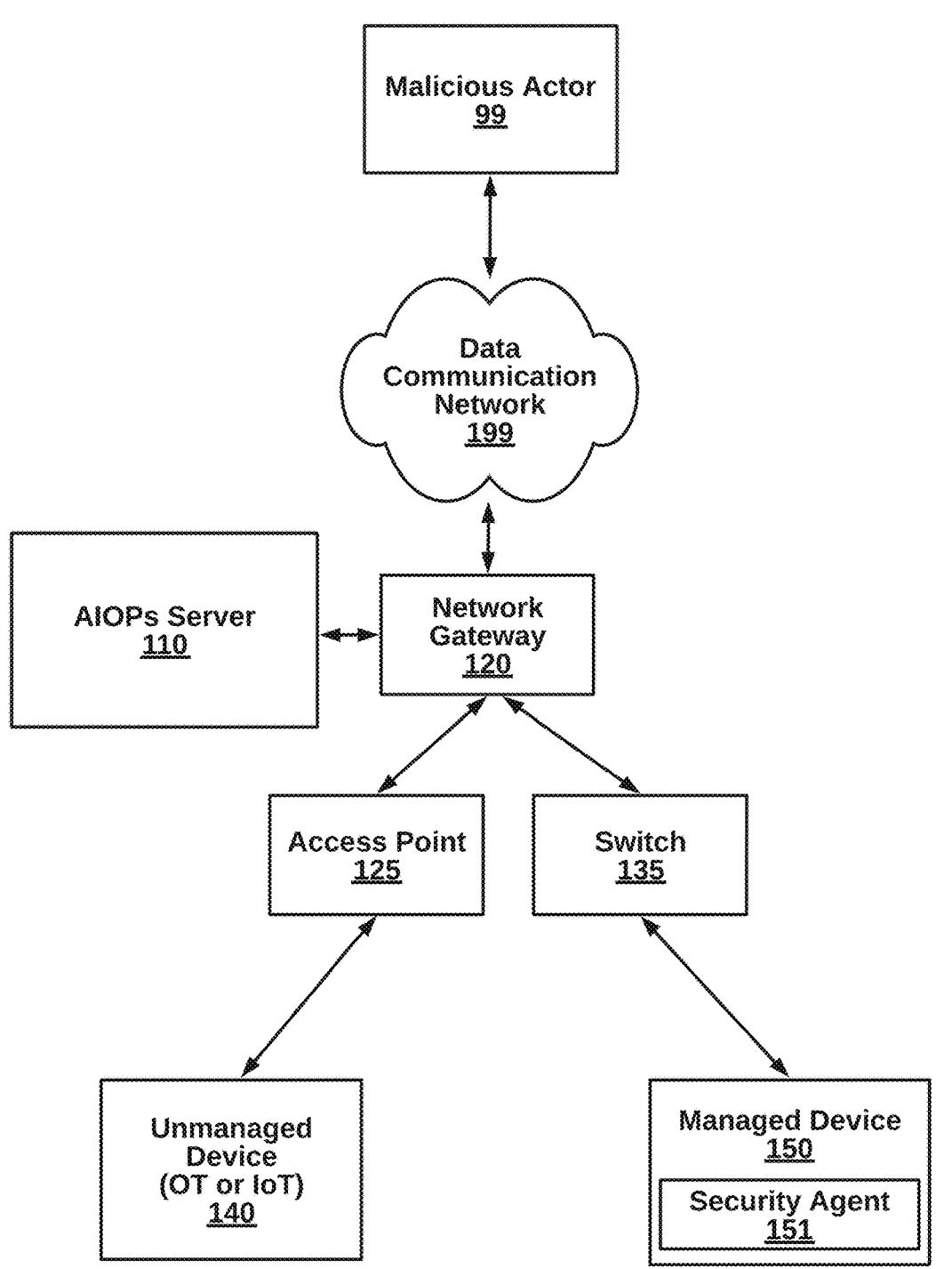
FIG. 1 is a high-level block diagram illustrating aspects of a system for securing OT and/or IoT devices on an enterprise network using AIOPs, according to some embodiments.
Figure 2:
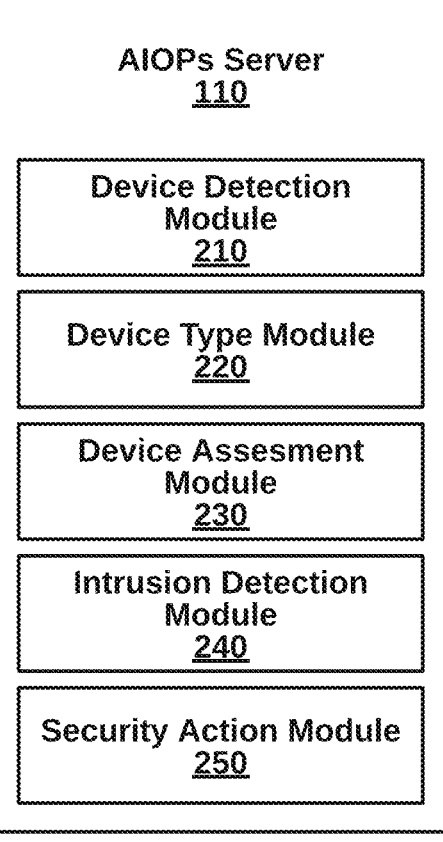
FIG. 2 is a more detailed block diagram illustrating an AIOPs server of the system of FIG. 1, according to an embodiment.
Figure 6:
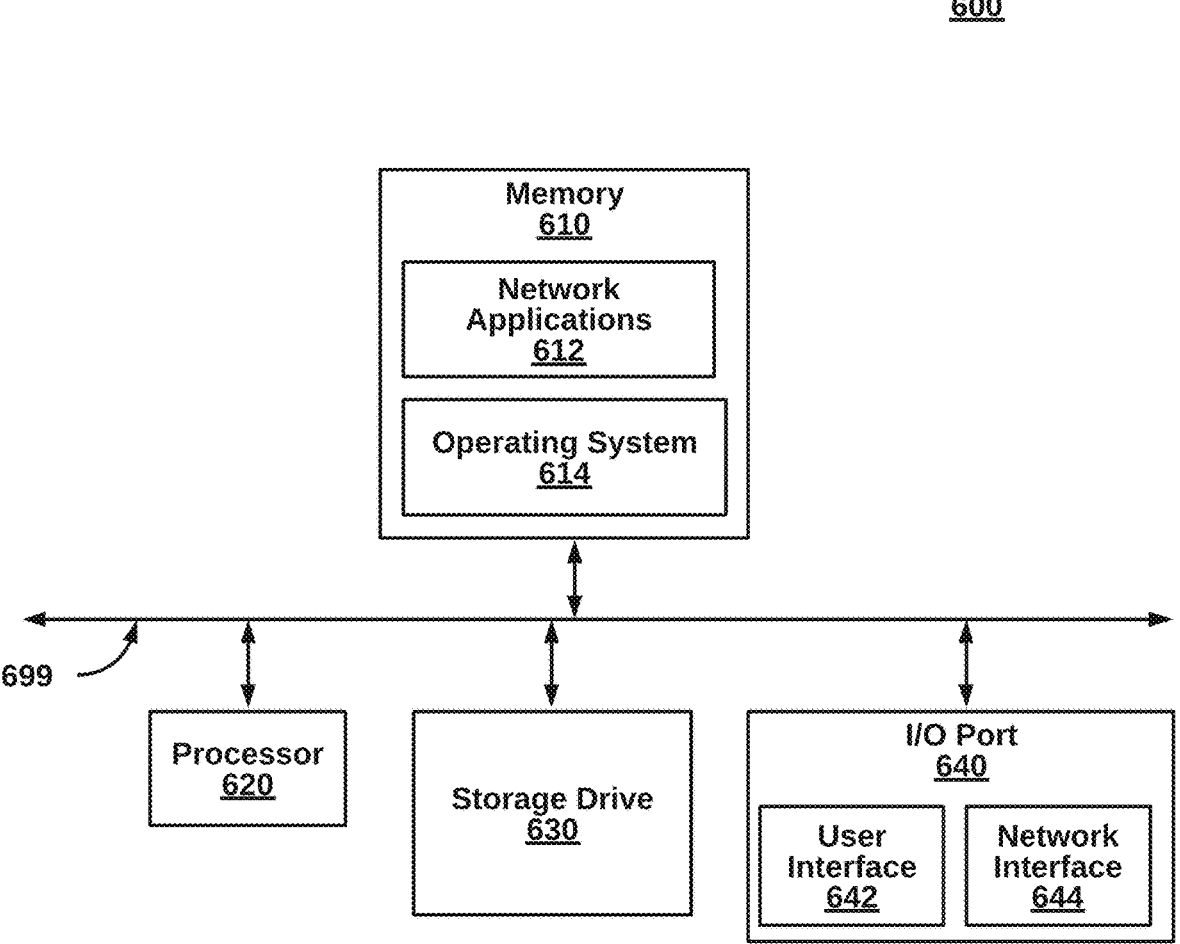
FIG. 6 is a block diagram illustrating an example computing device for the system of FIG. 1, according to an embodiment.

FIG. 1 is a high-level block diagram illustrating a system 100 for securing OT and/or IoT devices on an enterprise network using AIOPs, according to an embodiment. The system 100 includes an AIOPs server 110, a network gateway 120, an access point 125 and a switch 135, unmanaged devices 140 and managed devices 150. Other embodiments of the system 100 can include additional components that are not shown in FIG. 1, such as routers, switches, access points, and IT devices. Further, there can be more network gateways, access points and switches, and edge devices. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., AIOPs server 110, network gateway 120, access point 130 and devices connected to switch 135). The components can also be connected via wireless networking (e.g., connected to access point 125). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPv4 or Ipv6 address spaces.

In one embodiment, the AIOPs server 110 applies AI modeling to predict anomalous behavior for externally securing unmanaged devices. An AI detection model can be developed for identifying new devices and determining device types. Further, an AI intrusion model can be developed for predicting anomalous behavior while monitoring the detected devices. The AI models can be trained from unsupervised cluster learning from a history of externally captured transactions of known OT and IoT devices. One implementation collects application and destination based data every 1 minute, for instance. The AI device detection model is executed to extract OT and IoT device features and perform prediction with a trained DBSCAN cluster model by checking for matching cluster labels. A noisy output over a period of time can be flagged as indicative of a compromised device. In response, a security action, such as a notification or an auto black-listing policy can be triggered and the client can be moved to quarantine. The client can be quarantined with a dynamic deauth and be moved to a restricted VLAN. The client, confused that it has successfully joined the enterprise network in an unrestricted manner, may not be triggered to flood the network. There are many other embodiments of using AIOPs to control unmanaged devices.

One example implementation of the AIOPs server 110 is FortiAIOPS, by Fortinet Inc. of Sunnyvale, California. The AIOPs server 110 can be integrated with or work in conjunction with the network gateway 120 in some implementations. In other implementations, the AIOPs server 110 is distributed across several networking devices of the enterprise. In yet another implementation, the AIOPs server 110 has cloud support from more powerful data centers and continually updated databases.

The network gateway 120 manages network transactions and network devices for the enterprise network, and coordinates with the AIOPs server 110 for security management of unmanaged devices. In one case, managed device are internally managed by the network gateway 120 through an internal process while unmanaged devices are externally managed to the network gateway 120 by observing and controlling network interactions. In another case, network controller or network firewall services are provided. The network gateway 120 can also provide details of device information including network identifier, types of applications running on the device based on network data generated by the device (see screenshot 300 of FIG. 3A), and network destinations of the device access (see screenshot 310 of FIG. 3B).

The access point 125 and the switch 135 are part of the network infrastructure supporting edge devices. Transactions from the edge devices exchanged between themselves and remote networks can be logged and reported for training models. The network infrastructure itself can also be considered part of the managed devices, along with edge managed devices. Various parameters can be recorded for the transactions in a tabular or database format. The parameters can include metadata from headers and analytics, such as application name or type, destination address, application category, number of sessions, number of applications and bandwidth. Other event parameters can be categorized as denial of service, misconfig and network scan, for example. Aside from the specific example of FIG. 1, both access point 125 and switch 135 can connect to both managed and/or unmanaged devices.

The unmanaged devices 140 are edge devices that are not deeply integrated with the enterprise network because there is no internally executing process providing access to network management. Typically, the unmanaged devices 140 have very low CPU and memory resources and are either micro controller managed with no operating system, or have thin versions of operations systems having just special purpose network operations. Generally, an OT device can be a piece of hardware of software that monitors and controls physical processes, devices (e.g., sensors) or infrastructure in industrial settings (e.g., manufacturing or utilities). Some implementations partition the OT network from the IT network, and thus have limited security functionality without the AIOPs sever 110. Generally, an IoT device is not primarily a computing product, but has been modified or retrofitted for network connectivity (e.g., security devices, smart apparel, and smart locks or thermostats). The IoT devices are often BYOD devices owned by employees or users that are new connections to the enterprise network.

To the contrary, managed devices 150 are edge devices that are more tightly integrated through security agent 151 which can be a downloaded app, agent or daemon (e.g., FortiEDR by Fortinet of Sunnyvale, California), for instance, that has a direct communication line with managing devices. The security agent 151 can have a authenticated and secured communication connection to the AIOPs server 110 (or network gateway 110) to directly provide internal parameters and data that has to be inferred externally for unmanaged device 140. The managed devices 150 can be controlled from exposing unintended interfaces and vulnerabilities. The managed devices 150 can include IT devices and network infrastructure devices, such as server blades, personal computers, and laptops. However, some traditionally managed IT devices may be temporarily treated as unmanaged, such as when a new operation system has been installed and the agent has yet to be upgraded for handling.

FIG. 2 is a more detailed block diagram illustrating the AIOPs server 110 of the system of FIG. 1, according to one embodiment. The AIOPs server 110 includes a device detection module 210, a device type module 220, a device assessment module 230, an intrusion detection module 240 and a security action module 250. The components can be implemented in hardware, software, or a combination of both.

The device detection module 210 can detect an unknown OT or IoT device, on the enterprise network comprising a plurality of known OT and IoT devices. To do so, network transactions related to downstream network devices are captured and the unknown OT or IoT devices can be distinguished from non-OT or non-IoT network devices on the enterprise network. The plurality of OT and IoT devices are unable to internally execute non-native apps. In some cases, unmanaged IT devices are detected and processed in the same manner.

The device type module 220 determines a device type of the unknown OT or IoT device using an AIOP detection model. The AIOP detection model is trained from unsupervised cluster learning from a history of externally captured network transactions of the plurality of known OT and IoT devices. The parameters can explicitly or implicitly include applications, destination address, application category, number of sessions, number of applications, and bandwidth. Some parameters are unique to a device or a session, and other parameters are abstracted over several devices or sessions. In one case, an internal or cloud database maintains a list of device types and typical parameters for matching. One example sends probes to an unknown device that are designed to reveal signature responses that are indicative of a certain type of operating system, and follow-up probes can discriminate a version of the identified operating system.

The device assessment module 230 assesses vulnerabilities of the unknown OT or IoT device by predicting services from correlating the device type to the externally captured network transactions. The internal or cloud database can return a list of typical services when queried about a specific device type. The services can be verified by sending artificially generated probes or by examining data from the transactions.

The intrusion detection module 240 provides real-time monitoring of the unknown OT or IoT device to detect anomalous activity. The activity can be related to an assessed vulnerability of the unknown OT or IoT device, and determined from an AIOP intrusion model generated from the history of known OT and IoT devices. Parameters for model training can include real time-event type (e.g., denial of service, misconfig packet attack, network scan, spoof attack, rogue attack, EAP code failure, date and time of event, and time lapse from previous occurrence of same event type). Other types wireless events (e.g., from access points) and logs to be monitored include, without limitation, 802.1x/AAA failure attempts, excessive 802.11 auth/assoc requests, excessive 802.1x/weauth requests, excessive probe requests, EAPOL exchanges, IP theft/reuse/cloning. Other types of wired events (e.g., from switches) can include, without limitation, port security violation attacks, MAC address flooding, spanning tree protocol changes, unicast flooding, DHCP snooping violations, and dynamic ARP inspection violations.

The security action module 250, responsive to detecting anomalous activity, takes a security action based on relevant security rules. The rules can be based on a device name, a device type, anomalous activity, network administrator settings or user settings, as examples. For example, security rules can be configured to quarantine to a VLAN, move to a different channel, throttle client transactions (e.g., limit bandwidth), or block communications, among other remediations.

II. Methods for External AIOPs Security of Unmanaged Devices (FIGS. 4-5)

Figure 4:
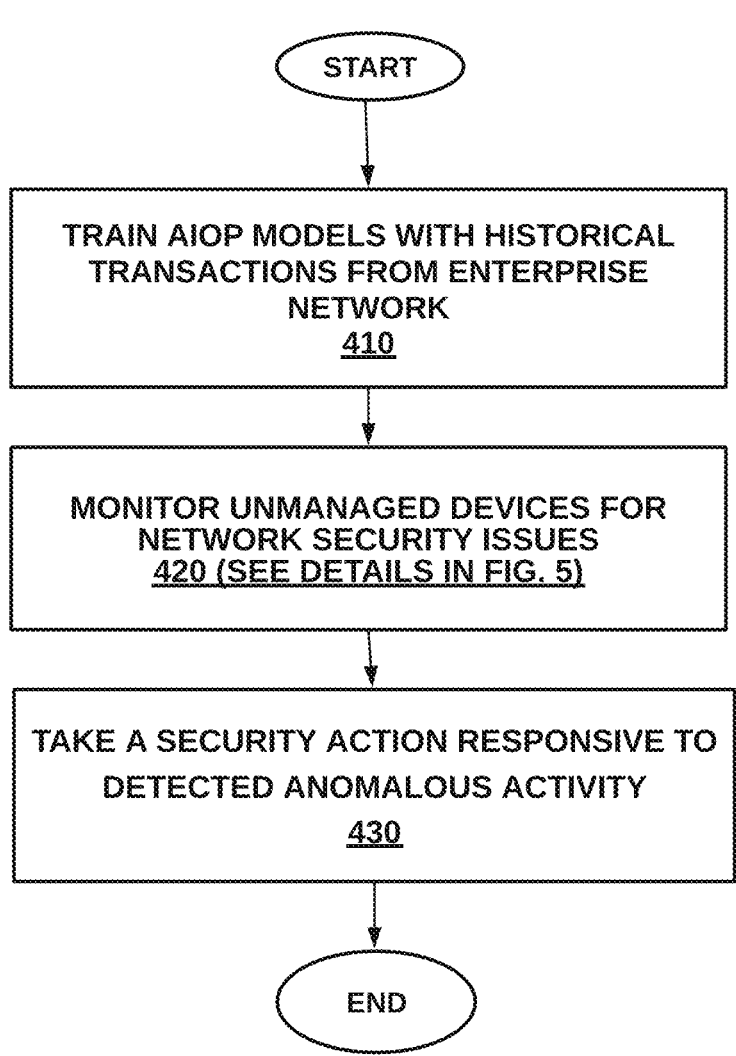
FIG. 4 is a high-level flow diagram illustrating a method for securing OT and/or IoT devices on an enterprise network using AIOPs, according to an embodiment.
Figure 5:
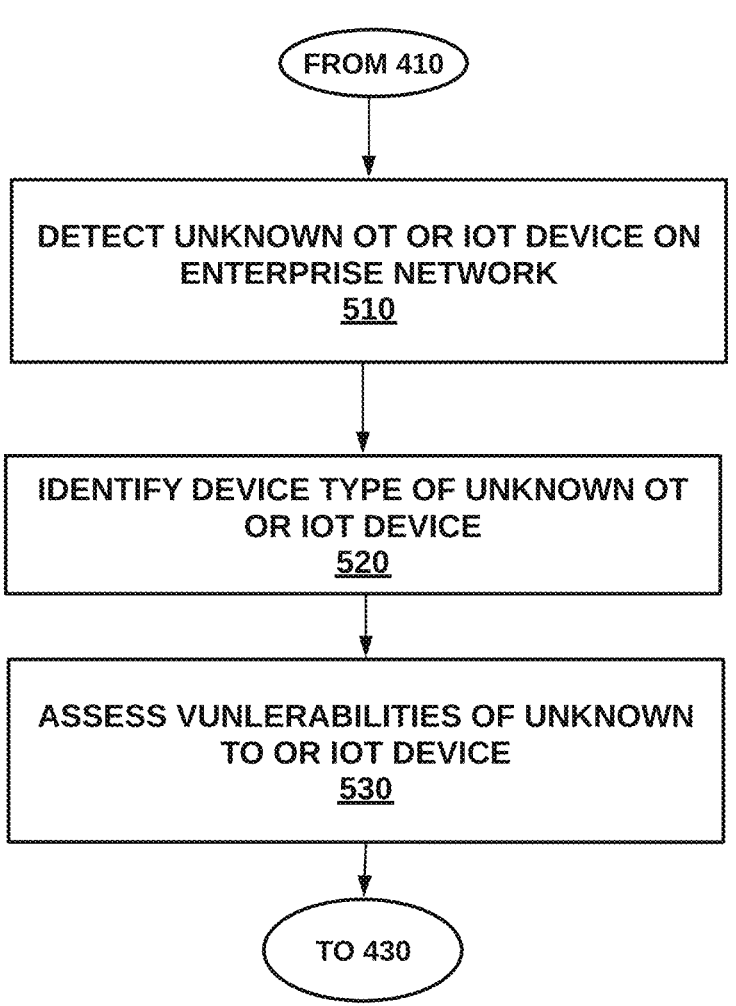
FIG. 5 is a flow diagram illustrating a step of automatically associating a surveillance security policy with a user on video based on Wi-Fi data, from the method of FIG. 5, according to an embodiment.

FIG. 4 is a high-level flow diagram of a method 400 for securing OT and/or IoT devices on an enterprise network using AIOPs, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, AIOP models are trained with historical transactions from historical enterprise transactions, as described herein.

At step 420, unmanaged devices of an enterprise network are monitored for network security issues using, the AIOP models, as described more fully below with respect to FIG. 5.

At step 430, responsive to detecting anomalous activity, a security action is taken based on relevant security rules.

Returning to the monitoring step 420, FIG. 5 shows more details according to an embodiment. At step 510 an unknown OT or IoT device is detected on the enterprise network comprising a plurality of known OT and IoT devices, by capturing network transactions related to downstream network devices and identifying the unknown OT or IoT device from non-OT or non-IoT network devices on the enterprise network. The plurality of OT and IoT devices are unable to internally execute non-native apps. In one embodiment, an unmanaged non-OT or non-IoT device is discovered.

At step 520, a device type of the unknown OT or IoT device is identified using an AIOP detection model. The AIOP detection model can be trained from unsupervised cluster learning from a history of externally captured network transactions of the plurality of known OT and IoT devices, as described above.

At step 530, vulnerabilities of the unknown OT or IoT device are assessed by predicting services from correlating the device type to the externally captured network transactions.

III. Computing Device for External AIOPs Security of Unmanaged Devices (FIG. 6)

FIG. 6 is a block diagram illustrating a computing device 600 for use in the system 100 of FIG. 1, according to one embodiment. The computing device 600 is a non-limiting example device for implementing each of the components of the system 100, including AIOPs server 110, network gateway 120, access point 125 and switch 135, unmanaged devices 140 and managed devices 150. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a network security device, for externally securing unmanaged devices on an enterprise network using Artificial Intelligence Operations (AIOPs), the method comprising the steps of:

detecting an unknown operational technology (OT) or Internet of Things (IoT) device, on the enterprise network comprising a plurality of known OT and IoT devices, by capturing network transactions related to downstream network devices and identifying the unknown OT or IoT device from non-OT or non-IoT network devices on the enterprise network, wherein the unknown OT or IoT device and the plurality of known OT and IoT devices are unable to internally execute non-native apps;

determining a device type of the unknown OT or IoT device using an AIOP detection model, wherein the AIOP detection model is trained from unsupervised cluster learning from a history of externally captured network transactions of the plurality of known OT and IoT devices;

assessing vulnerabilities of the unknown OT or IoT device by predicting services from correlating the device type to the externally captured network transactions;

monitoring the unknown OT or IoT device to detect anomalous activity related to an assessed vulnerability of the unknown OT or IoT device, using an AIOP intrusion model generated from the history of known OT and IoT devices; and responsive to detecting anomalous activity, taking a security action based on relevant security rules.

2. The method of claim 1, further comprising: checking for malware based on the detected anomalous activity.

3. The method of claim 1, wherein the plurality of OT and IoT devices are unable to internally execute non-native apps, wherein the non-native apps comprise at least one of a third-party app, a downloaded app, and a daemon.

4. The method of claim 1, wherein the AIOP detection model is trained from unsupervised cluster learning from a history of externally captured network transactions of the plurality of known OT and IoT devices, wherein the captured network transaction comprise at least one parameter from application name or type, destination address, application category, number of sessions, number of applications, and bandwidth.

5. The method of claim 1, wherein the vulnerability assessment of the unknown OT or IoT device by predicting services from correlating the device type to the externally captured network transactions further comprises sending artificially generated probes.

6. The method of claim 1, wherein the vulnerability assessment of the unknown OT or IoT device by predicting services from correlating the device type to the externally captured network transactions further comprises capturing organic transactions.

7. The method of claim 1, wherein monitoring the unknown OT or IoT device to detect anomalous activity related to the assessed vulnerability of the unknown OT or IoT device, using the AIOP intrusion model generated from the history of known OT and IoT devices, wherein the detected anomalous activity comprises at least one parameter of real time-event type, date and time of event, and time lapse from previous occurrence of same event type.

8. The method of claim 7, wherein the real time-event type parameter comprises at least one of denial of service, misconfig, and network scan.

9. The method of claim 7, wherein the real time-event type parameter comprises at least one of denial of service, misconfig, and network scan.

10. The method of claim 1, wherein the captured network transactions related to downstream network devices and identifying the unknown OT or IoT device from non-OT or non-IoT network devices on the enterprise network are captured from at least one of a network gateway, an access point, a router, a switch and a station.

11. The method of claim 1, wherein the network security device comprises an AIOPs server.

12. The method of claim 1, wherein the AIOP detection model is trained from unsupervised cluster learning from a history of externally captured network transactions of the plurality of known OT and IoT devices, wherein the captured network transaction comprise at least one parameter from application name or type, destination address, application category, number of sessions, number of applications, and bandwidth.

13. The method of claim 1, wherein the vulnerability assessment of the unknown OT or IoT device by predicting services from correlating the device type to the externally captured network transactions further comprises sending artificially generated probes.

14. The method of claim 1, wherein the vulnerability assessment of the unknown OT or IoT device by predicting services from correlating the device type to the externally captured network transactions further comprises capturing organic transactions.

15. The method of claim 1, wherein monitoring the unknown OT or IoT device to detect anomalous activity related to the assessed vulnerability of the unknown OT or IoT device, using the AIOP intrusion model generated from the history of known OT and IoT devices, wherein the detected anomalous activity comprises at least one parameter of real time-event type, date and time of event, and time lapse from previous occurrence of same event type.

16. The method of claim 1, wherein the captured network transactions related to downstream network devices and identifying the unknown OT or IoT device from non-OT or non-IoT network devices on the enterprise network are captured from at least one of a network gateway, an access point, a router, a switch and a station.

17. A non-transitory computer-readable medium in a network security device, on a data communication network, storing code that when executed, performing a method for externally securing unmanaged devices on an enterprise network using Artificial Intelligence Operations (AIOPs), the method comprising:

detecting an unknown operational technology (OT) or Internet of Things (IoT) device, on the enterprise network comprising a plurality of known OT and IoT devices, by capturing network transactions related to downstream network devices and identifying the unknown OT or IoT device from non-OT or non-IoT network devices on the enterprise network, wherein the unknown OT or IoT device and the plurality of known OT and IoT devices are unable to internally execute non-native apps;

determining a device type of the unknown OT or IoT device using an AIOP detection model, wherein the AIOP detection model is trained from unsupervised cluster learning from a history of externally captured network transactions of the plurality of known OT and IoT devices;

assessing vulnerabilities of the unknown OT or IoT device by predicting services from correlating the device type to the externally captured network transactions;

monitoring the unknown OT or IoT device to detect anomalous activity related to an assessed vulnerability of the unknown OT or IoT device, using an AIOP intrusion model generated from the history of known OT and IoT devices; and responsive to detecting anomalous activity, taking a security action based on relevant security rules.

18. The method of claim 17, further comprising:

checking for malware based on the detected anomalous activity.

19. The method of claim 17, wherein the plurality of OT and IoT devices are unable to internally execute non-native apps, wherein the non-native apps comprise at least one of a third-party app, a downloaded app, and a daemon.

20. A network security device, on a data communication network, for externally securing unmanaged devices on an enterprise network using Artificial Intelligence Operations (AIOPs), the network security device comprising:

a processor;

a network interface communicatively coupled to the processor and to a data communication network; and a memory, communicatively coupled to the processor and storing:

a device detection module to detect an unknown operational technology (OT) and/or Internet of Things (IoT) device, on the enterprise network comprising a plurality of known OT and IoT devices, by capturing network transactions related to downstream network devices and identifying the unknown OT or IoT device from non-OT or non-IoT network devices on the enterprise network, wherein the unknown OT or IoT device and the plurality of known OT and IoT devices are unable to internally execute non-native apps;

a device type module to determine a device type of the unknown OT or IoT device using an AIOP detection model, wherein the AIOP detection model is trained from unsupervised cluster learning from a history of externally captured network transactions of the plurality of known OT and IoT devices;

a device assessment module to assess vulnerabilities of the unknown OT or IoT device by predicting services from correlating the device type to the externally captured network transactions;

an intrusion monitoring module to monitor the unknown OT or IoT device to detect anomalous activity related to an assessed vulnerability of the unknown OT or IoT device, using an AIOP intrusion model generated from the history of known OT and IoT devices; and a security action module to, responsive to detecting anomalous activity, take a security action based on relevant security rules.

\* \* \* \* \*